United States Patent [19]
Duault et al.

[11] Patent Number: 5,307,347
[45] Date of Patent: Apr. 26, 1994

[54] METHOD AND APPARATUS FOR SHARING A TELECOMMUNICATIONS CHANNEL AMONG MULTIPLE USERS

[75] Inventors: Maurice Duault, St. Laurent du Var, France; Jeffrey J. Lynch, Apex; Ramon E. Snyder, Raleigh, both of N.C.

[73] Assignee: International Business Machines Corporation, Armonk, N.Y.

[21] Appl. No.: 867,251

[22] Filed: Apr. 10, 1992

[51] Int. Cl.⁵ .......................... H04J 3/16; H04J 3/12
[52] U.S. Cl. .............................. 370/85.1; 370/85.11; 370/95.1; 370/110.1; 370/85.7
[58] Field of Search ....................... 370/94.1, 94.2, 80, 370/60.1, 110.1, 85.1, 85.2, 85.3, 85.4, 85.5, 85.15, 85.7, 85.9, 85.11, 85.12; 340/825.05, 825.5, 825.51, 825.06

[56] References Cited

U.S. PATENT DOCUMENTS

| | | | |
|---|---|---|---|
| 4,672,662 | 6/1987 | Nishino et al. | 370/110.1 |
| 4,821,265 | 4/1989 | Albal et al. | 370/110.1 |
| 4,835,769 | 5/1989 | Donaghue, Jr. et al. | 370/110.1 |

Primary Examiner—Wellington Chin
Attorney, Agent, or Firm—Stephen T. Keohane

[57] ABSTRACT

A method and an apparatus allows multiple users to share one or more data communication lines without requiring the users to actively participate in the arbitration. The preferred embodiment comprises an ISDN Port Connection Manager (PCM) for managing the use of each of the individual channels of one or more line ports having ISDN service thereon. The ISDN PCM manages the use of the channels between applications using such distinct access methods as IBM's Virtual Telecommunications Access Method (VTAM), TCP/IP, and Open Systems Interconnect (OSI) access methods. The ISDN PCM determines that an application needs access to an ISDN channel, determines the availability of the ISDN network and sets up the communication between the application and the network if the channel is available. If no channel is available at that time, the ISDN PCM indicates to the application when the channel becomes available so that the application may determine whether it still needs access.

22 Claims, 7 Drawing Sheets

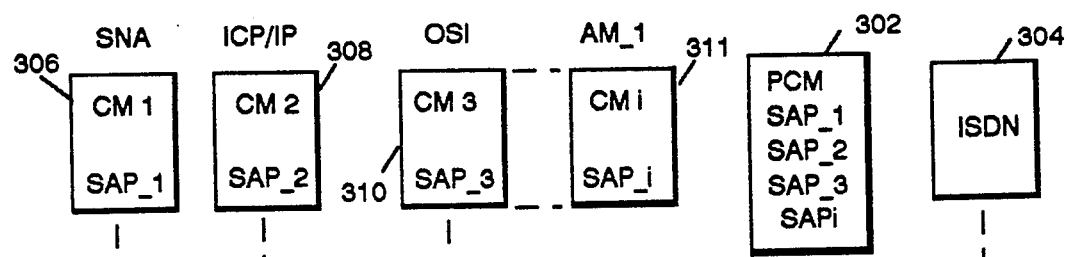
FIG. 7
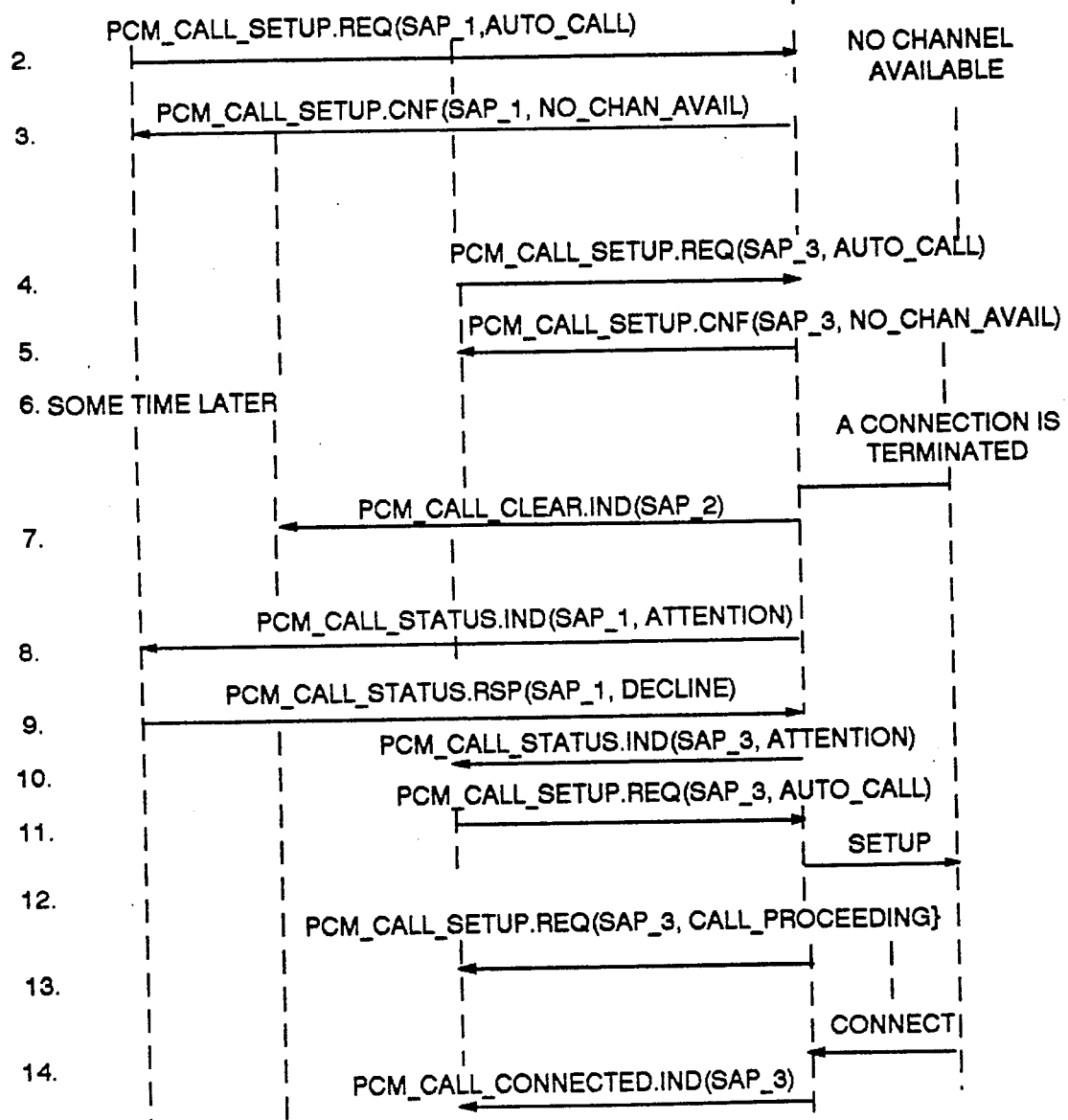

METHOD AND APPARATUS FOR SHARING A TELECOMMUNICATIONS CHANNEL AMONG MULTIPLE USERS

BACKGROUND OF THE INVENTION

1. Field of the Invention

The present invention relates in general to telecommunications systems and, more particularly, to a method and apparatus for sharing one or more telecommunications channels among multiple users.

2. Prior Art

Subscribers to telecommunications services are offered a wide array of different kinds of services from a multiplicity of vendors. Wide Area Telephone Service (WATS), Foreign Exchange Service (FEX), and plain old telephone service (POTS) are examples of services offered to the public.

The services are provided over either a leased or a dial-up line. A leased line is one which the subscriber contracts for on a monthly basis, while a dial-up line uses the carrier circuit-switching facilities to establish a circuit every time the subscriber wants to communicate between specific transmitting and receiving locations. In either case, one or more telephone lines are brought to the subscriber's home or office so that the subscriber may interface with the telephone system.

At the subscriber's premises, the subscriber has, many times, a variety of different needs for using the telephone line. For instance, the subscriber may need to use the line for voice communication using a telephone or for data communications through a modem. In other situations, a subscriber, such as a large business, may have one or more host processors having many applications which need access, from time to time, to a telecommunications channel via a communications controller. A telecommunications access method, such as IBM's Virtual Telecommunications Access Method (VTAM), resides in the host processor and provides an interface between the host processor and other resources in the communications network.

FIG. 1 illustrates, in a simple block diagram, communications between a number of host processors and the communications network. A number "N" of physical line ports 10 are connected at the subscriber's premises 12 for connection to the communications network 14. Each host processor 18 has an associated communications access method (AM 1, AM 2, ... AM N) 20. Examples of communications protocols supported by the various access methods include SNA, TCP/IP, and OSI. Each access method 20 supports a plurality of applications (A 1, A 2, ... A z) 22 which need access to the telecommunications network 14. Examples of situations where an application needs access to the telecommunications network include a stock broker needing to access real-time stock prices and a doctor wishing to obtain a patient's records located at the main hospital across town. FIG. 1 is shown as an example of a network configuration. Networks may be configured in many other ways: for example, a host processor may have more than one access method.

Each access method 20 "owns," or controls, one or more of the physical line ports 10 for allowing an application to access the communications network. The number of line ports 10 and the type of service supported on each is dependent upon the extent and type of use by the host processor 18 and the access method 20. Until now, there was no way for the different communications access methods (different protocol stacks) to "share" a line port without the access methods actively sharing information with one another. Because access methods are not designed to coordinate their use of network resources with one another, telecommunications lines cannot be shared between them.

In other words, an application using one access method could obtain access only to the communications channels controlled by that one access method. The application could not access other communications channels controlled by other access methods. This is the result of the access methods not being designed for communicating with one another. As an example, an application operating on VTAM using IBM's System Network Architecture (SNA) can obtain access to the telecommunications network only via the telecommunications channels controlled by the VTAM. VTAM cannot obtain access to the telecommunications channels controlled by other access methods such as TCP/IP or OSI. Thus, the line ports which are paid for by the subscriber cannot be optimally used, as the telecommunications activity cannot be distributed among the available lines. Rather, some lines may be idle while others are congested.

This problem, until recently, was not serious as the cost of leasing the line ports and their associated services was relatively inexpensive. This problem, however, is especially exacerbated with the advent of the Integrated Services Digital Network (ISDN).

With ISDN, voice and data are integrated over digital lines thereby promising to replace multiple (often under-utilized) dedicated voice and data lines entering customer premises with one or a few lines using ISDN technology. Using the ISDN basic rate interface (BRI), the same wires which once could carry only a single voice conversation (or a data call simulating voice with a modem) now can carry two individual voice conversations and a separate signalling or data transmission. With basic rate access, one "D" channel (which is available for signalling and data) and two "B" channels (which each can carry an independent voice or data call) can be utilized at the same time on the single telephone line. The ISDN primary rate interface (PRI) offers twenty-three (thirty in European systems) B channels and one D channel and is designed for customers requiring greater capacity than provided by the basic rate interface. Thus, through the use of either the ISDN BRI or ISDN PRI, multiple applications at the ISDN subscriber's premises could access the same telephone line at the same time.

Presently, however, the physical port through which the subscriber obtains the ISDN service can be controlled by only a single access method. For example, where a customer subscribes to the ISDN PRI service, it has access to twenty-three independent B channels and one D channel. The customer cannot however distribute access to those channels over several access methods, because one access method controls the physical port. This is quite inefficient: one physical port at the user's premises may be fully utilized while others may be at least partially inactive. Using the present technology, the applications of the first access method have access only to their dedicated port and not to the remaining physical ports.

SUMMARY OF THE INVENTION

A system allows multiple communication access methods to share one or more telecommunications lines without requiring them to actively participate in arbitration. The system determines that an access method wants to use a telecommunications line, determines the availability of the telecommunications line, and set ups the communication between the access method and the network if the line is available. If the line is not available at that time, the system indicates to the user when the line becomes available so that the user may determine whether it still needs access.

This is particularly applicable in today's complex networking environment where many access methods operating in accordance with distinct protocols cannot in many cases easily coordinate the use of physical ports with one another.

The particular and preferred embodiment described in the Detailed Description section comprises an ISDN Port Connection Manager (PCM), which implements the ISDN Q.931/2/3 network access protocol and manages the use of each of the individual channels of one or more line ports having ISDN service thereon. The ISDN PCM manages the use of the channels between applications using such distinct communication protocols as IBM's System Network Architecture (SNA), Transmission Control Protocol/Internet Protocol (TCP/IP), and Open Systems Interconnect (OSI).

By managing the use of the ISDN interface, the present invention allows the optimal use of the two available "B" channels per line port of the ISDN Basic Rate Interface (BRI) and of the twenty-three available "B" channels of the ISDN Primary Rate Interface (PRI) (thirty in Europe).

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 7 shows an alternative example of an outgoing flow scenario as arbitrated by the ISDN PCM.

DETAILED DESCRIPTION OF THE PREFERRED EMBODIMENT

The method and apparatus of the present invention may be utilized wherever there are multiple communication access methods wishing to access one or more telecommunications ports. In the preferred embodiment, the invention is described as operating under IBM's Link Services Architecture (LSA) which is more fully described in a related patent application entitled "LOGICAL GROUPING OF LAYER ENTITIES IN A LAYERED COMMUNICATION ARCHITECTURE", Ser. No. 07/588,214, filed Sep. 26, 1990. Because LSA is modelled after the Open System Interconnection (OSI) standard for communication between data processing or end points and between layers within a node, a description of the OSI model is set forth below.

The OSI Reference Model

Figure 1:
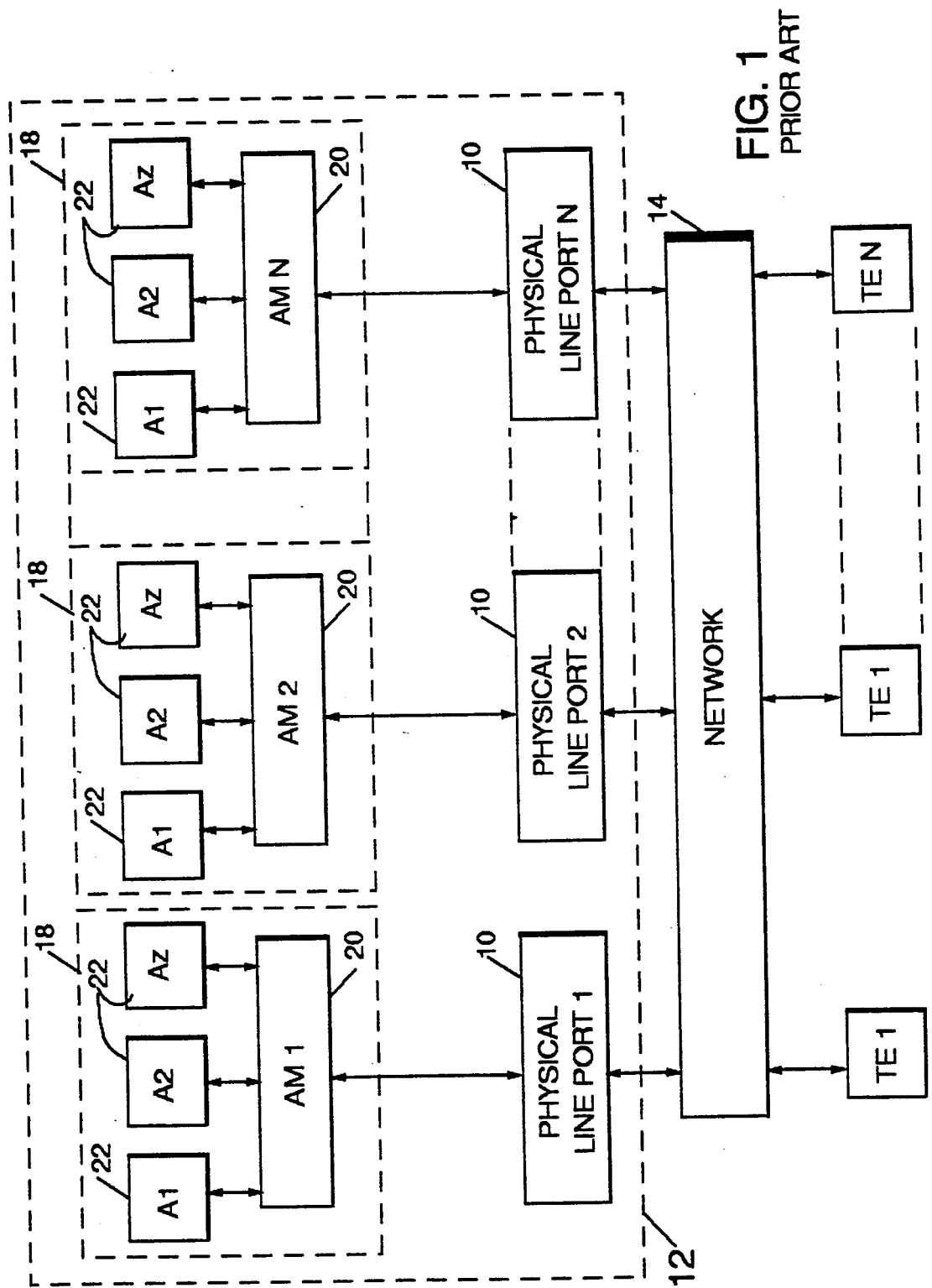
FIG. 1 (prior art) is a block diagram illustrating the present physical partitioning between access methods.
Figure 2:
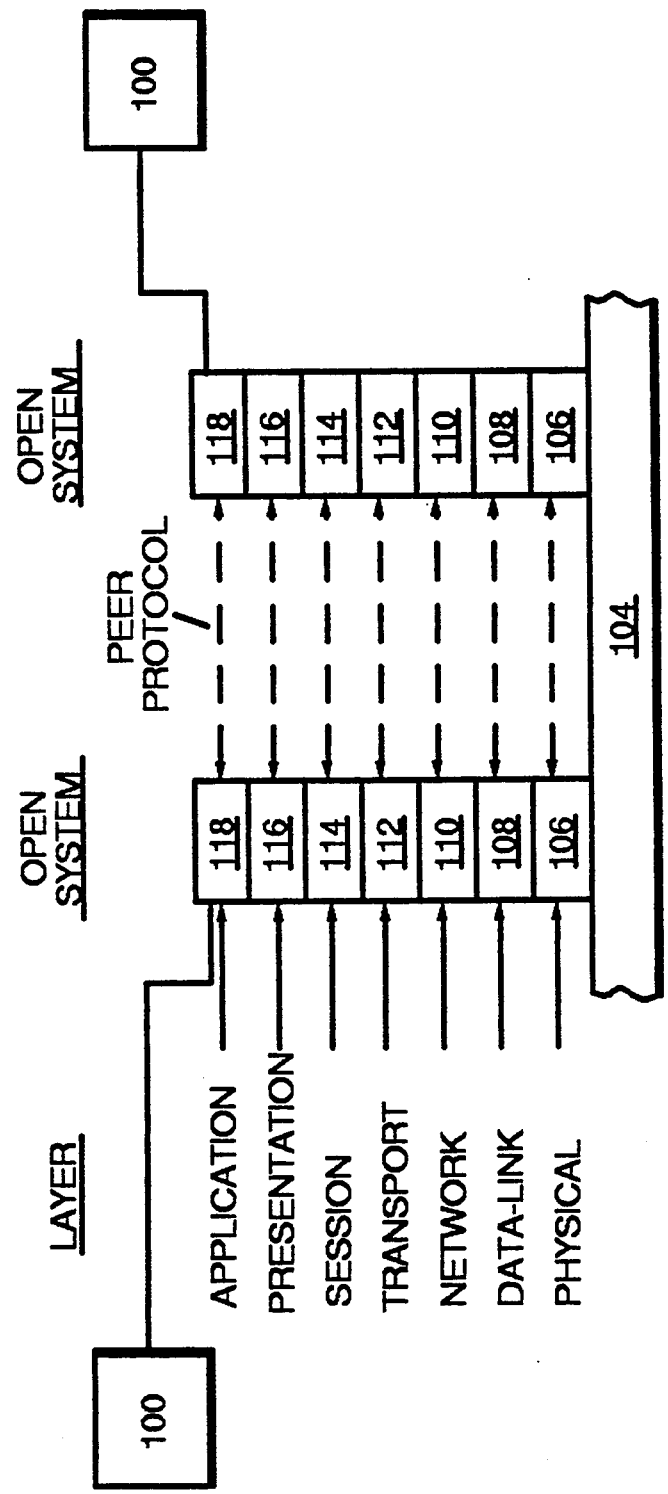
FIG. 2 (prior art) shows the layered model of the Open Systems Interconnect (OSI) standard.

The OSI model is shown in FIG. 2. In accordance with OSI, it is possible to replace the function of any of the layers with equivalent function implemented in a different manner without affecting the proper operation of the remaining layers of the system. The communication between one application, such as a software module or device, 100, and another module or device 102 over a communication medium 104, such as the cable, is described on the basis of seven layers, each of which performs certain functions within the communication protocol. The lowest layer is the physical layer 106. The physical layer 106 involves the actual connections and the signalling to the communication medium 104.

The second layer is the data link layer 108. In this layer, the physical delivery of raw data between nodes on the network is accomplished. The physical signaling protocol, including link information, synchronization information, error correction information, protocol data unit (PDU) sizes, framing, etc., are conducted at this layer. In most networks, fundamental communication errors are detected and corrected here by retransmission or other means. Communication between a pair of nodes on the network depends on compatible implementation of data link layers. In summary, the link layer establishes, maintains, and releases data links, and is used for error detection and physical flow control.

The third layer is the network layer 110. This layer controls the routing of information through the network, including addressing, network initialization, and the switching, segmenting, and formatting of the information. Sometimes acknowledgment of raw delivery data is accomplished at the network layer; sometimes, at the data link layer.

The next layer is the transport layer 112. This layer controls transparent data transfer, end-to-end control, multiplexing, mapping, and the like. Data delivery may imply reliable delivery, as opposed to a best effort to deliver the data which must be accounted for in the layers below the transport layer. Other classes of reliability may be selected as options as well. For example, at the transport layer, for reliability class 0, it is assumed that the data has been communicated in a reliable manner, and such things as the retransmission of missing data, reordering of the data delivered out of order, recovery from transmission errors, etc., has been corrected at or below the transport layer.

The fifth layer is the session layer 114. The session layer 114 uses the information from the transport layer to group pieces of data as associated with a given activity referred to as a session. Sessions occur between two entities at various locations on the network. At a given time, single nodes on the network may be involved in multiple sessions going to a plurality of other nodes, and many sessions may be multiplexed over the same communication medium. However, the session layer services provide for the end-to-end delivery of data associated with a given logical activity without interference by data from other activities.

Layer six is the presentation layer 116. The presentation layer 116 relates to the interface between the session layer 114 and the application layer 118 at layer seven. In the application layer 118, the actual data is applied to or received from the software module or device (100 or 102) at each end of the communication. The presentation layer 116 presents the data in a form suitable for use in the application layer 118 without compromising the network-related integrity of the session layer 114. The presentation layer 116 therefore relates to data interpretation, format, and code transformation, while the application layer relates to user application entities and management functions.

Figure 3:
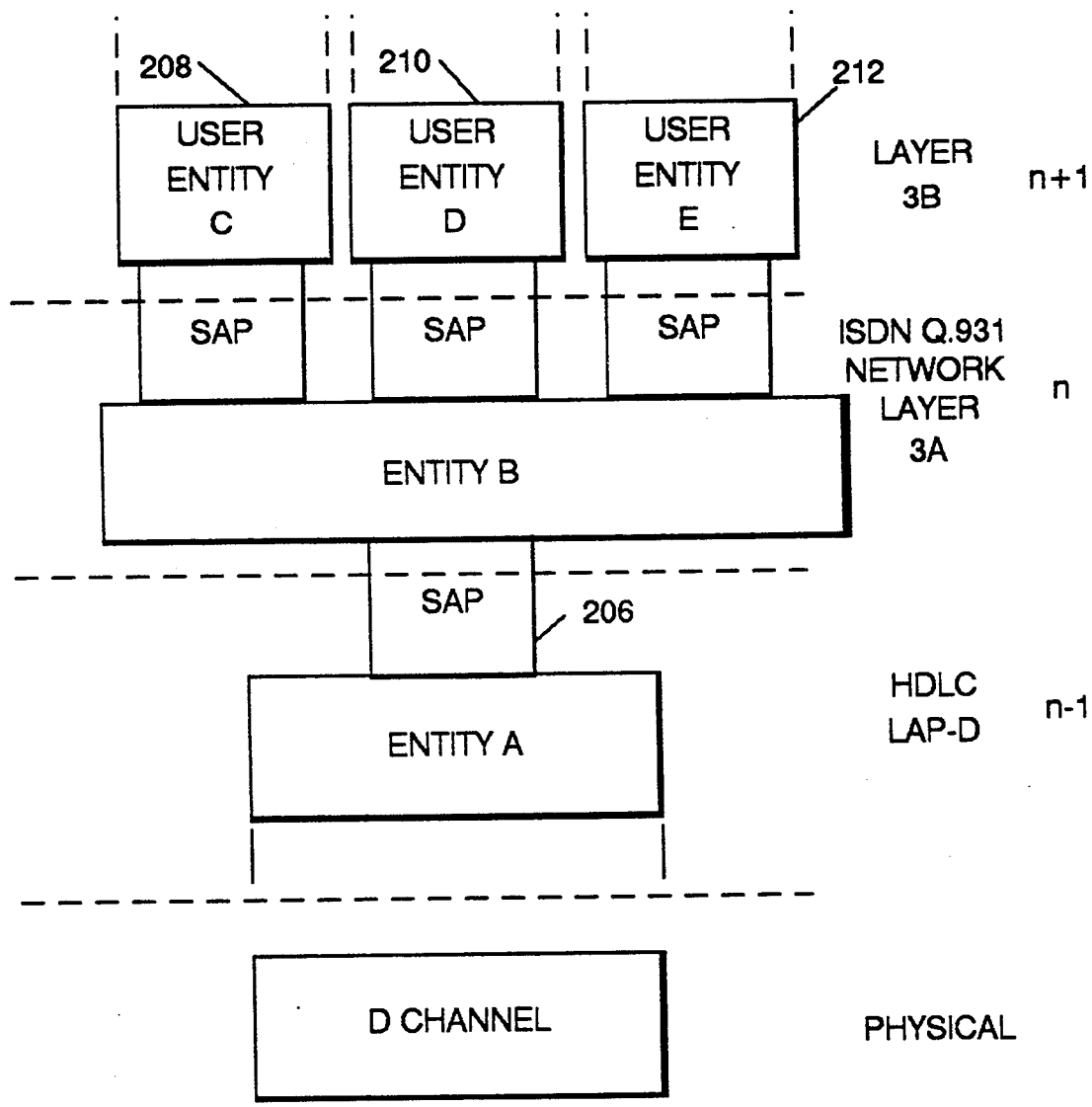
FIG. 3 shows one example of the interconnection of entities in different layers of a communications environment by service access points (SAPs).

In addition, the standard defines an entity as an active element in a layer that interacts with other entities in the adjacent upper or lower layers. An element, and therefore an entity, may be thought of as a process, although the OSI standard defines entity more generally. FIG. 3 conceptually illustrates one relationship between entities in layers n−1, n, and n+1 in accordance with the OSI standard. One scenario of the illustrative relationship of FIG. 3 is that Protocol Data Units (PDUs) incoming to entity A in layer n−1 are to be routed to provider entity B in layer n, which in turn routes the PDUs to appropriate final user entities C, D or E in layer n+1. In this particular example, entity A is linked to entity B by a service access point (SAP) 206. Entity A might be linked by SAPs to entities other than entity B. Entity B is linked to entities C, D and E by SAPs 208, 210 and 212, respectively. On receipt of a PDU by entity A, the entity strips header information relevant to its layer from the PDU, examines that header information, and routes the remaining part of the PDU to entity B in layer n. The SAP 206 linking A to B is identified by the header information which that entity strips and examines. Entity B further strips header information and routes the remaining part of the PDU to the appropriate n+1 entity (C, D or E).

Link Services Architecture (LSA) defines and specifies the layer service definitions required for interaction between the Medium Access Control (MAC), Logical Link Control (LLC), and the 3A network layers of the OSI reference model and the IBM X.25 Logical Link Control Layer. In general, the MAC and the LLC combine to comprise the second layer of the OSI reference model, or the data link layer. Also, the OSI network layer (layer 3) is conceptually divided into three sublayers; layers 3A, 3B and 3C. Layer 3A, or the subnetwork access protocol, as the name implies, defines how to communicate to a subnetwork to set up and terminate connections, send and receive data, etc. Examples include the X.25 packet layer protocol for accessing an X.25 network and the Q.931 protocol for accessing an ISDN. Layer 3C, or the subnetwork independent convergence protocol, provides generic network layer services while layer 3B, the subnetwork dependent convergence protocol, maps layer 3C capabilities to the specific subnetwork access protocol (layer 3A) that is being used.

Within LSA, a common command format is used for requests and replies to and from the lower layers, regardless of the particular transmission medium over which the users are communicating.

Thus, referring again to FIG. 3, assume entity A at layer n−1 is operating at layer 2 of the OSI Reference Model, for example HDLC Lap D on the D channel of an ISDN Primary Rate interface. Entity B could be an OSI Layer 3A entity operating in conformance with the ISDN Q.931/2/3 network access protocols. Entities C, D and E would then be operating at the OSI Network layer 3B and above. As an example, entities C, D and E could be the equivalent Layer 3B portions of the access methods of three different protocols such as SNA, TCP/IP, and OSI. In the preferred embodiment of the present invention, Entity B (ISDN PCM) manages the use of the physical ISDN interface between entities C, D, and E (access methods operating in conformance with SNA, TCP/IP, and OSI, respectively).

Figure 4:
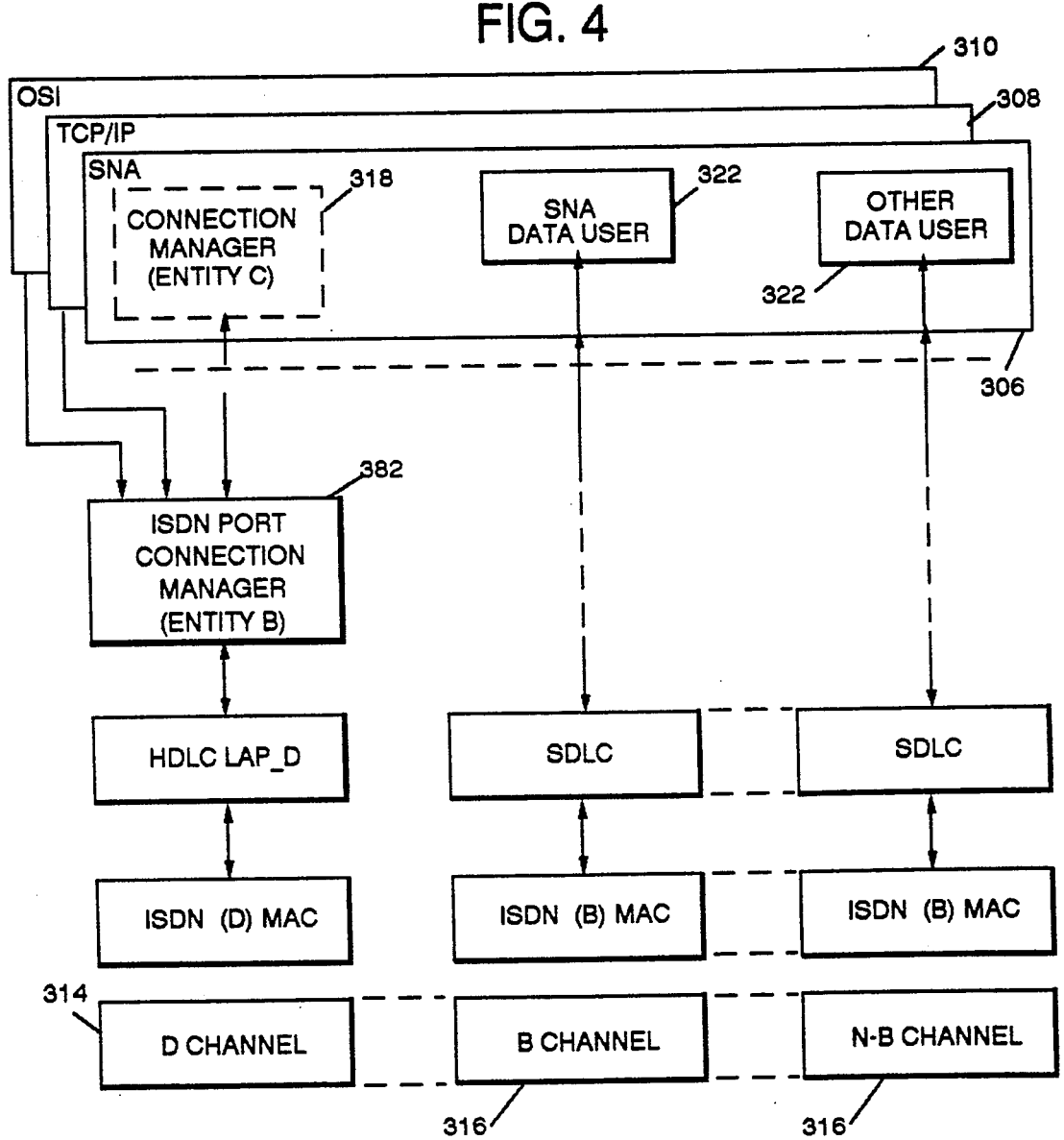
FIG. 4 shows a general Link Services Architecture (LSA) perspective of the Integrated Services Digital Network (ISDN) and the ISDN Port Connection Manager (PCM) of the present invention.

FIG. 4 provides another illustration in block diagram form of the ISDN Port Connection Manager 302 of the present invention. As can be seen, the ISDN Port Connection Manager 302 manages the use of an ISDN PRI service 304 between three access methods 306, 308 and 310, each conforming to a different protocol (for example): SNA, TCP/IP, and OSI, respectively. Entity B, which conforms to Link Services Architecture, as described above, provides an interface between the ISDN channels 304 and the access methods 306, 308, and 310.

The ISDN PRI 304 comprises a single D channel 314 for conveying signalling and control and twenty-three B channels 316 (thirty in Europe) for carrying data. As was discussed above, each of the B channels is independent in that it can be connected to a location different from the remaining B channels. In other words, each B channel can be thought of as a separate telecommunications line. The corresponding signalling and control data for the B channels is conveyed over a common D channel.

The ISDN port connection manager (ISDN PCM) 302 performs the switched and leased connections required to establish physical (bit-level) connectivity through an ISDN network. This involves activating the physical interface and then performing the connection procedure required to make a connection through the ISDN.

The ISDN PCM 302 works in conjunction with a Connection Manager 318 in each access method, which instructs the ISDN PCM 302 when to establish/break a connection. In the past, there has been only one Connection Manager 318 controlling a physical interface. The ISDN PCM 302 of the present invention manages the use of the physical interface, ISDN PRI, in this example, between a number of users, SNA 306, TCP/IP 308, and OSI 310, in the present example. In the most general sense, the ISDN PCM 302 translates between Link Services Architecture primitives and ISDN Q.93x signalling messages for the purpose of establishing circuit and packet mode connections across an ISDN. It is specifically designed for communicating with the signalling node of the ISDN using LAPD data link control over the signalling channel (D channel SAPI=0) of the interface to the ISDN. FIG. 4 shows a general LSA perspective of ISDN. The ISDN PCM 302 sits on top of HDLC LAPD 320 and interacts with the network on the D channel 314. Protocols such as SDLC can be run by data users (e.g., SNA Path Control) 322 on each of the B channels 316.

Using Service Access Point (SAP) definitions, the ISDN PCM 302 allows shared control of the D channel 314 between multiple users using multiple access methods 306, 308 and 310 for outgoing calls. In addition, the ISDN PCM 302 performs the routing of incoming calls to the various connection managers 318 of the access methods 306, 308 and 310 by examining the called party number and related information in the Q.931 SETUP message and associating it to one of any number of SAPs assigned to the different connection managers.

In Link Services Architecture, a set of messages and requests, or "primitive constructs", are utilized, via SAPs, for communication between the LSA entity and user, i.e., the access methods of the OSI layer 3B and higher protocol layers. More specifically, primitive constructs, or primitives, are sent by the connection management portion of the access method, generically referred to as the Connection Manager (CM), to the ISDN PCM to request a telephony service, and the ISDN PCM returns primitives for providing the access method with various types of information, such as the progress of a telephone call.

An access method invokes an ISDN function by its Connection Manager issuing an appropriate LSA primitive to the ISDN PCM. The ISDN PCM processes the primitive and, if no errors are found and there is an ISDN channel available at the ISDN interface, formats the information from the primitive into a request which is sent to the ISDN network. The ISDN PCM conducts all communication with the ISDN network until the desired connection is established across the network.

When there is an incoming call from the ISDN network to an access method, the ISDN PCM interfaces between the network and the access method. The ISDN PCM notifies the appropriate Connection Manager, via LSA primitives exchanged through its SAP, that a connection is being requested by the network. The call notification is routed to the appropriate CM by the PCM after it makes the necessary associations to relevant information such as called party number and/or called party subaddress. The Connection Manager can accept or reject the connection. If the access method refuses the call, the ISDN PCM so informs the ISDN network.

Various LSA ISDN primitive constructs and their corresponding meanings are detailed below in Table 1. These primitive constructs are used in flow scenarios between the ISDN PCM 302 and other Connection Managers 318 to be discussed.

TABLE 1

Primitive Construct Definitions used by the ISDN PCM
1. PCM_ACTIVATE_SAP.request - Resource sharing requires a SAP for each Connection Manager 318 sharing the ISDN PCM 302. When a PCM_ACTIVATE_SAP.request is issued by a Connection Manager, the particular called-address information and related information to be associated with the connection manager and its SAP are passed as parameters.
   a. LOCAL_ADDRESSn_STATE - A one-byte field, where
     * X'00' = no incoming calls allowed with SAP n
     * X'01' = incoming allowed with SAP n
   b. LOCAL_ADDRESSn - This is the Called Party Number of the incoming Call SETUP Message to be associated with SAP n.
   c. LOCAL_SUBADDRESSn - This is the Called Party subaddress of the incoming Call SETUP Message to be associated with SAP n.
2. PCM_CALL_SETUP - This command has two independent modes of operation:
   a. A paired request/confirm mode followed by a PCM_CALL_CONNECT.indication
   b. A paired indication/response mode, which may also be followed by a PCM_CALL_CONNECT.indication.

The main objective of the first mode (a) is to make a call or to place an ISDN interface into auto-answer mode. The main objective of the second mode (b) is to answer a call.

A feature of the PCM_CALL_SETUP allows for the routing of incoming calls to a particular user SAP according to addressing information specified in the PCM_ACTIVATE_SAP.request to support the resource sharing feature. Another part of this same feature provides the queueing of outbound calls per user SAPs pending the transition from all B/H channels busy to the required B or H channel becoming available. When the latter happens, the ISDN PCM 302 notifies the particular CM 318 queued that its required channel (B/H) is available.

a. PCM_CALL_SETUP.request—If the receipt of a RELEASE COMPLETE message (in response to the outbound SETUP message) indicates all B channels or a particular type H channel are busy, this busy condition is made known to the using SAP in the PCM_CALL_SETUP.confirm. At the same time, the using SAP is placed on a busy queue (FIFO) for all B channels or an H channel queue according to the required H channel type (data rate). When an inbound Call Clearing message is received, the channel identity is examined to see if it matches an element in the appropriate B or H channel queues. If it does, the associated SAP is pulled from the queue to route a PCM_CALL_STATUS.indication to the designated SAP to inform the using Connection Manager that its required channel is now available. The designated user then reissues a PCM_CALL_SETUP.request.
   b. PCM_CALL_SETUP.indication—When the incoming SETUP message is received, the addressing information elements (i.e., the called party number, the called party subaddress, or both) are examined to see if they match appropriate addressing parameters provided by the one or more outstanding PCM_ACTIVATE_SAP.request primitives. If a match occurs (allows for any calling address), the subsequent PCM_CALL_SETUP.indication is routed to the associated SAP. If a match does not occur, the call is rejected.

3. PCM_CALL_STATUS Interface—This primitive supports a number of functions including resource sharing. If an outbound call has been rejected and queued to a given SAP because of an all-channels-busy condition (see PCM_CALL_SETUP.request), this condition will be dequeued when a Call Clearing message indicates the appropriate channel is available, as described in the PCM_CALL_STATUS description below.
   a. PCM_CALL_STATUS.indication—
     * ATTENTION flag—If this PCM_CALL_STATUS.indication is generated due to a queued channel-busy condition, this flag is turned on and this indication is routed to the SAP user(s) who caused the busy condition to be queued. This is an indication that the SAP user(s) may now reissue the PCM_CALL_SETUP.request through the original SAP.

The connection manager (SAP user) can reply to this indication with either a PCM_CALL_STATUS.response or a PCM_CALL_SETUP.request
   b. PCM_CALL_STATUS.response—
     * STATUS flag—If the connection manager which has been notified that a channel is free via the PCM_CALL_STATUS.indication wishes to retry the call, it may respond with a PCM_CAL- L_STATUS.response with this flag turned on. The connection manager then reissues the PCM_CALL_SETUP.request through the original SAP. If the connection manager does not need to retry the call, it responds with the flag turned off (decline). In this case the PCM will send a PCM_CALL_STATUS.indication, with the ATTENTION flag set on, to the next queued user.

Figure 5:
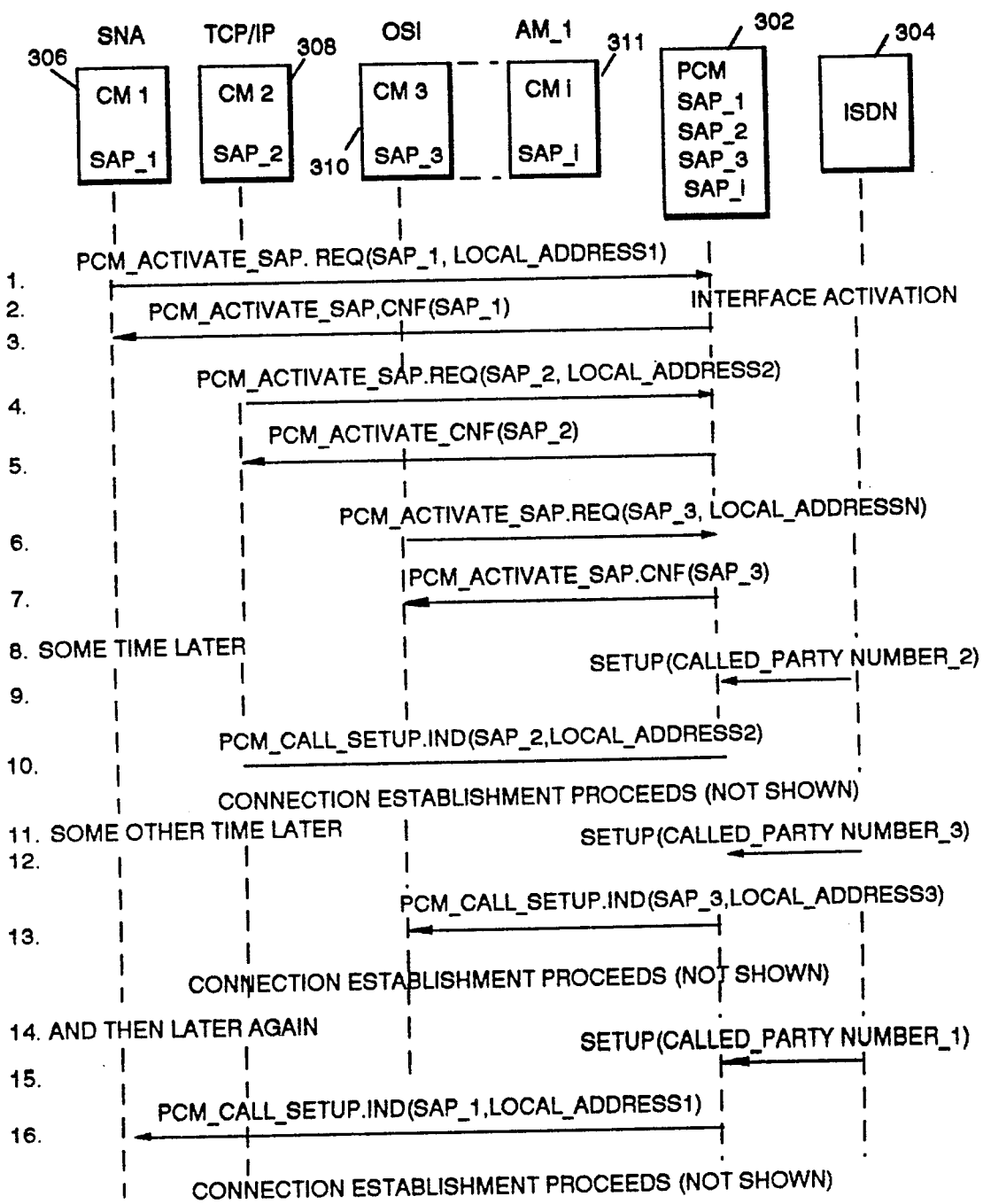
FIG. 5 illustrates an incoming flow scenario as controlled by the ISDN PCM.

FIG. 5 illustrates an incoming call flow scenario for call connection to the various access methods based upon access method availability/unavailability and call party information elements. The access methods 306, 308, 310 and any number of other access methods represented by AM-i conforming to the various protocols, SNA, TCP/IP, and OSI, respectively, each individually may activate its communication with the ISDN PCM 302 so that it may access the telecommunications facility (the ISDN 304) for incoming calls. The communication activation is accomplished via each access method's respective SAP (SAP_1, SAP_2, SAP_3 and SAP_i) by each respective Connection Manager (CM 1, CM 2, CM 3 and CM i) to the ISDN PCM 302. The access method's local address (i.e., subscriber telephone number) must also be indicated to the ISDN PCM 302. The ISDN PCM then, in turn, activates the ISDN interface so that incoming calls may be accepted.

The arrows pointing to the left and to the right in FIG. 5 represent primitives being exchanged between the entities, and the labels directly above the arrows represent the particular primitive being exchanged. The primitives are exchanged sequentially from the top to the bottom of the figure. This incoming call flow scenario (as well as the outgoing call scenario illustrated in FIG. 6) is used as an example of many scenarios to illustrate the interfacing and arbitration capabilities of the ISDN PCM of the present invention.

1. Initially, at Time 1, SNA 306 (CM 1) activates its SAP (SAP_1) with the ISDN PCM 302 and indicates its local address (its subscriber telephone number) via primitive PCM_ACTIVATE_SAP.req.

2. If this is the first SAP activated, at Time 2, the ISDN PCM 302 activates the ISDN interface by communicating with the ISDN 304 over the D channel.

3. The ISDN PCM 302 confirms to the SNA 306 that its SAP and the ISDN interface is activated via primitive PCM_ACTIVATE_SAP.cnf.

4. In a similar manner, TCP/IP 308 activates, via primitive PCM_ACTIVATE_SAP.req, its SAP with ISDN PCM 302.

5. Similarly, ISDN PCM 302 responds with a PCM_ACTIVATE_SAP.cnf primitive indicating that the SAP is activated.

6. OSI 310 activates its SAP with ISDN PCM 302 via primitive PCM_ACTIVATE_SAP.req.

7. Again, ISDN PCM 302 responds with a PCM_ACTIVATE_SAP.cnf primitive indicating that the SAP is activated.

8. The referenced interfaces are established and time elapses.

9. An ISDN SETUP message is received by the ISDN PCM 302 from the ISDN 304 indicating that TCP/IP 308 has received a call.

10. The ISDN PCM 302 indicates to the TCP/IP 308 that it has received a call via primitive PCM_CALL_SETUP.ind. At this point, the TCP/IP 308 may communicate with the party over the ISDN 304.

11. Time elapses.

12. Another ISDN SETUP message is received by the ISDN PCM 302 from the ISDN 304 this time indicating that OSI 310 has received a call.

13. The ISDN PCM 302 indicates to the OSI 310 that it has received a call via primitive PCM_CALL_SETUP.ind. At this point, the OSI 310 may communicate with the party over the ISDN 304.

14. Time elapses.

15. Again, an ISDN SETUP message is received by the ISDN PCM 302 from the ISDN 304 this time indicating that SNA 306 has received a call.

16. In a similar manner, the ISDN PCM 302 indicates to the SNA 306 that it has received a call via primitive PCM_CALL_SETUP.ind. At this point, the SNA 306 may communicate with the party over the ISDN 304.

Figure 6:
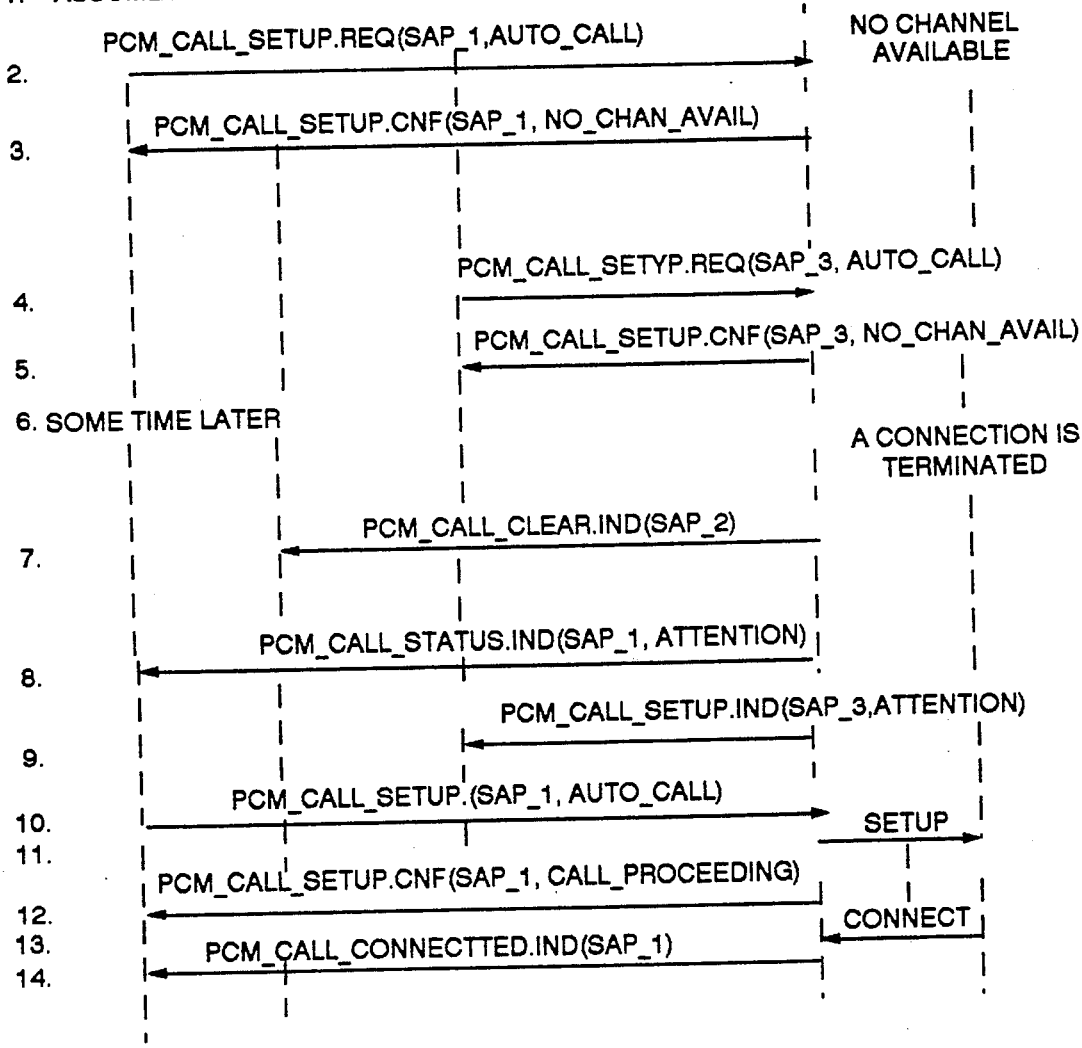
FIG. 6 shows an example of an outgoing flow scenario as arbitrated by the ISDN PCM.

FIG. 6 illustrates an outgoing call flow scenario for resource allocation based upon resource availability/unavailability. The access methods (SNA 306, TCP/IP 308, OSI 310 and any number of other access methods represented by AM_i) each individually may request access to the telecommunications facility (the ISDN 304). The access method requests are made via each access method's respective SAP (SAP_1, SAP_2, SAP_3 and SAP_i) by each respective Connection Manager (CM 1, CM 2, CM 3 and CM i) to the ISDN PCM 302. The ISDN PCM then, in turn, determines the availability/unavailability of the ISDN and arbitrates its use.

As in FIG. 5, the arrows pointing to the left and to the right represent primitives being exchanged between the entities, and the labels directly above the arrows represent the particular primitive being exchanged.

1. Initially, at Time 1, all channels of the ISDN port 304 are occupied with calls in progress by access methods over the ISDN network.

2. At Time 2, SNA 306 requests access to the ISDN 304 by sending a PCM_CALL_SETUP.req primitive to the ISDN PCM 302. The primitive indicates to the ISDN PCM 302 that SNA 306 (via SAP_1) needs access to the ISDN 304.

3. Because no channels are available on the ISDN 304, the ISDN PCM responds with a PCM_CALL_SETUP.cnf primitive so indicating.

4. Some time later, in a similar manner, OSI 310 requests, via primitive PCM_CALL_SETUP.req, access to the ISDN 304.

5. Again, ISDN PCM 302 responds with a PCM_CALL_SETUP.cnf primitive indicating that no channel is available.

6. Some time later, a channel (used by TCP/IP 308) becomes available on the ISDN 304. This is indicated by a "CLEAR" signal on the D channel to the ISDN PCM 302 by the ISDN 304.

7. ISDN PCM 302 indicates to TCP/IP 308 that the channel it was using on the ISDN 304 is now cleared.

8 and 9. A PCM_CALL_STATUS.indication is sent to each CM (SNA 306 and OSI 310) that had previously tried to make a connection, indicating that a channel is free and they should try again. In other words, the ISDN PCM 302 is indicating to the SNA and OSI that access is available if they still need access.

At this point, each of the notified CM's compete for the available channel on a first come fist serve basis.

10. SNA 306 responds with a PCM_CALL_SETUP.req primitive for obtaining access to the ISDN 304.

11. ISDN PCM 302 communicates with the ISDN 302 over the D channel for setting up the call, with such parameters as the phone number being called and the phone number doing the calling.

12. ISDN PCM 302 indicates to the SNA 306 that the connection establishment is proceeding over the ISDN 304 via primitive PCM_CALL_SETUP.cnf.

13. The ISDN 304 indicates to the ISDN PCM 302 that the call is connected.

14. The ISDN PCM 302 indicates to the SNA 306 that the call is connected. At this point, the SNA 306 may begin communicating with the party at the other end.

FIG. 7 illustrates an alternative outgoing call flow scenario that notifies the queued users sequentially rather than notifying all of them at once. (FIG. 6 and FIG. 7 are identical until step 8.)

Once again, the access methods (SNA 306, TCP/IP 308, OSI 310 and any number of other access methods represented by AM_i) each individually may request access to the telecommunications facility (the ISDN 304). The access method requests are made via each access method's SAP (SAP_1, SAP_2, SAP_3 and SAP_i) by each Connection Manager (CM 1, CM 2, CM 3 and CM i) to the ISDN PCM 302. The ISDN PCM then, in turn, determines the availability/unavailability of the ISDN and arbitrates its use.

As in FIG. 5, the arrows pointing to the left and to the right represent primitives being exchanged between the entities and the labels directly above the arrows represent the particular primitive being exchanged.

1. Initially, at Time 1, all channels of the ISDN port 304 are occupied with calls in progress by access methods over the ISDN network.

2. At Time 2, SNA 306 requests access to the ISDN 304 by sending a PCM_CALL_SETUP primitive to the ISDN PCM 302. The primitive indicates to the ISDN PCM 302 that SNA 306 (via SAP_1) needs access to the ISDN 304.

3. Because no channels are available on the ISDN 304, the ISDN PCM responds with a PCM_CALL_SETUP primitive so indicating.

4. Some time later, in a similar manner, OSI 310 requests, via primitive PCM_CALL_SETUP, access to the ISDN 304.

5. Again, ISDN PCM 302 responds with a PCM_CALL_SETUP primitive indicating that no channel is available.

6. Some time later, a channel (used by TCP/IP 308) becomes available on the ISDN 304. This is indicated by a "CLEAR" signal on the D channel to the ISDN PCM 302 by the ISDN 304.

7. ISDN PCM 302 indicates to TCP/IP 308 that the channel it was using on the ISDN 304 is now cleared.

8. A PCM_CALL_STATUS.indication, indicating that one or more channels are presently available, is sent to SNA 306 because it is next in line of previous call attempts. In other words, the ISDN PCM 302 is indicating to the SNA that access is available if it still needs access.

9. SNA 306 no longer wants to use the channel and indicates decline in the PCM_CALL_STATUS.response.

The PCM will sequentially notify each of the queued call users until one accepts.

10. A PCM_CALL_STATUS.indication is sent to OSI 310 indicating that one or more channels are presently available, because it is next in line of previous call attempts. Once again, the ISDN PCM 302 is indicating to the OSI that access is available if it still needs access.

11. OSI 310, which still wants to use the channel, indicates acceptance by retrying the (queued) call. OSI 310 responds with a PCM_CALL_SETUP primitive for obtaining access to the ISDN 304.

OSI 310 could have refused the call by responding with a PCM_CALL_STATUS response indicating decline. If OSI 310 had refused the call, the PCM would have continued its sequential notification of each of the queued calls until one accepted.

12. ISDN PCM 302 communicates with the ISDN 302 over the D channel for setting up the call with such parameters as the phone number being called and the phone number doing the calling.

13. ISDN PCM 302 indicates to the SNA 306 that the connection establishment is proceeding over the ISDN 304 via primitive PCM_CALL_SETUP.

14. The ISDN 304 indicates to the ISDN PCM 302 that the call is connected.

15. The ISDN PCM 302 indicates to the SNA 306 that the call is connected. At this point, the SNA 306 may begin communicating with the party at the other end.

Thus, it can be seen that the ISDN Port Connection Manager allows multiple access methods to access the various channels of a single ISDN port. In a more general sense, the port connection manager of the present invention allows multiple users over a plurality of line ports to share an application corresponding to a single access method. In addition, applications using various access methods may share one or more line ports and the corresponding channels available thereon.

While the invention has been particularly shown and described with reference to preferred embodiments thereof, it will be understood by those skilled in the art that various other changes in form and detail may be made without departing from the spirit and scope of the invention (for example, controlling and arbitrating the use of several analog public switch telephone network ports).

What is claimed is:

1. An apparatus for managing, among multiple users, the use of one or more data communications channels over which said users may communicate with other users, said apparatus comprising means for receiving a request from a user to access a channel of said one or more data communications channels, means for allowing said user to access said channel if said channel is available, and means for informing said user that said channel is unavailable if said channel is unavailable, informing said user that said channel is available when said channel becomes available, determining whether said user still needs access to said channel, and allowing said user to access said channel if said user still needs access to said channel.

2. The apparatus as defined in claim 1, wherein said apparatus communicates with said users via service access points.

3. The apparatus as defined in claim 2, wherein said users are applications utilizing access methods to obtain access to the data communication channels.

4. The apparatus as defined in claim 3, wherein said apparatus operates over the data link and network layers of the Open Systems Interconnect (OSI) standard.

5. The apparatus as defined in claim 4, wherein said apparatus conforms to Link Services Architecture (LSA).

6. The apparatus as defined in claim 1, wherein said data communication channels comprise at least one physical telecommunication line port.

7. The apparatus as defined in claim 6, wherein said data communication channels further comprise an Integrated Services Digital Network (ISDN).

8. A method of managing, among multiple users, the use of a data communications facility through which said users may communicate with other users, said method comprising steps of determining that a user of said multiple users needs access to said facility, determining the availability of said facility, and if said facility is available, allowing said user to access said facility, or if said facility is unavailable, indicating to said user that said facility is unavailable, indicating to said user that said facility is available when said facility becomes available, determining whether said user still needs access to said facility, and allowing said user to access said facility if said user still needs access to said facility.

9. For use in a system for providing communication services by means of an architecture having a plurality of layers, a port connection manager, in one of said layers, said one layer having an adjacent upper layer, for arbitrating the use of a data communication channel between at least two users in said adjacent upper layer comprising:
  means for receiving from a requesting user of said at least two users a request for access to said data communication channel;
  means for determining if said data communication channel is available for use;
  means for allowing said requesting user to access said channel if said channel is available;
  means for indicating to said requesting user that said channel is unavailable if said channel is unavailable; and
  means for indicating to said requesting user that said data communication channel is available when said data communication channel becomes available and for determining whether said requesting user still needs access to said data communication channel.

10. The port connection manager as defined in claim 9, wherein said at least two users each comprise a connection manager for managing its respective connection to said channel.

11. The port connection manager as defined in claim 10, wherein said port connection manager communicates with said connection managers via service access points (SAPs).

12. The port connection manager as defined in claim 11, wherein said port connection manager operates in the data link and network layers of the Open System Interconnect (OSI) reference.

13. The port connection manager as defined in claim 11, wherein said port connection manager communicates with said connection managers by exchanging primitive constructs therewith.

14. The port connection manager as defined in claim 9, wherein said port connection manager arbitrates the use of a plurality of data communication channels, at least a portion of said data communication channels being part of the Integrated Services Digital Network (ISDN).

15. The port connection manager as defined in claim 14, wherein said data communication channels are coupled to said port connection by a plurality of physical line ports.

16. For use in a system for providing communication services by means of an architecture having a plurality of layers, a port connection manager, in one of said layers, said one layer having an adjacent upper layer, for arbitrating the use of a data communication channel between at least two users in said adjacent upper layer comprising:
  means for receiving from each requesting user of said at least two users a request for activation of communication between said requesting user and said port connection manager;
  means for receiving a call on said data communication channel for one of said users; and
  means for directing said call to said user is said user had previously requested for activation of communication.

17. The port connection manager as defined in claim 16, wherein said port connection manager communicates with said connection managers via service access points (SAPs).

18. The port connection manager as defined in claim 17, wherein said port connection manager operates in the data link and network layers of the Open System Interconnect (OSI) reference.

19. The port connection manager as defined in claim 17, wherein said port connection manager communicates with said connection managers by exchanging primitive constructs therewith.

20. The port connection manager as defined in claim 16, wherein said port connection manager arbitrates the use of a plurality of data communication channels, at least a portion of said data communication channels being part of the Integrated Services Digital Network (ISDN).

21. The port connection manager as defined in claim 20, wherein said data communication channels are coupled to said port connection by a plurality of physical line ports.

22. An apparatus for managing, among at least a first and a second user, the use of one or more data communications channels over which said users may communicate with other users, said apparatus comprising:
  means for receiving a request from said first user to access a channel of said one or more data communications channels;
  means for allowing said first user to access said channel if one of said one or more data communications channels is available;
  means for informing said first user that no channel is available if none of said one or more data communications channels is available;
  means for receiving a request from said second user to access a channel of said one or more data communications channels;
  means for informing said second user that no channel is available if none of said one or more data communications channels is available;
  means for informing said first user that a channel is available when a channel of said one or more data communications channels becomes available, for determining whether said first user still needs access to a channel of said one or more data communications channels, and for allowing said first user to access said available channel if said first user needs access to a channel; and
  means for informing said second user that a channel of said one or more data communications channels is available if said first user does not need access to said available channel of if another channel of said one or more data communications channels becomes available, for determining whether said second user still needs access to a channel of said one or more data communications channels, and for allowing said second user to access said available channel if said second user needs access to a channel of said one or more data communications channels.

* * * * *